US008887069B2

(12) United States Patent
Tipirneni

(10) Patent No.: US 8,887,069 B2
(45) Date of Patent: Nov. 11, 2014

(54) VIRTUAL MEETING PLACE SYSTEM AND METHOD

(75) Inventor: Kishore Tipirneni, Glendale, AZ (US)

(73) Assignee: Voispot, LLC, Boca Raton, FL (US)

( * ) Notice: Subject to any disclaimer, the term of this patent is extended or adjusted under 35 U.S.C. 154(b) by 524 days.

(21) Appl. No.: 12/750,989

(22) Filed: Mar. 31, 2010

(65) Prior Publication Data

US 2010/0251140 A1 Sep. 30, 2010

Related U.S. Application Data

(60) Provisional application No. 61/165,047, filed on Mar. 31, 2009.

(51) Int. Cl.
*G06F 3/048* (2013.01)
*H04M 3/56* (2006.01)
*G06F 3/01* (2006.01)
*H04L 12/18* (2006.01)
*H04L 29/06* (2006.01)
*G06F 3/0481* (2013.01)

(52) U.S. Cl.
CPC ............ *G06F 3/011* (2013.01); *H04L 12/1822* (2013.01); *H04L 65/403* (2013.01); *G06F 3/0481* (2013.01)
USPC ............ 715/753; 715/733; 715/751; 709/204

(58) Field of Classification Search
CPC .......................... H04L 12/1822; G06F 3/0481
USPC ......................................................... 715/753
See application file for complete search history.

(56) References Cited

U.S. PATENT DOCUMENTS

| | | | |
|---|---|---|---|
| 6,901,448 B2 | 5/2005 | Zhu et al. | |
| 6,938,069 B1 | 8/2005 | Narayanaswamy | |
| 8,159,519 B2 * | 4/2012 | Kurtz et al. | 348/14.01 |
| 2001/0025299 A1 * | 9/2001 | Chang et al. | 709/204 |
| 2004/0107249 A1 * | 6/2004 | Moser et al. | 709/204 |
| 2005/0138560 A1 * | 6/2005 | Lee et al. | 715/719 |
| 2006/0252547 A1 * | 11/2006 | Mizrahi et al. | 463/42 |
| 2007/0067387 A1 * | 3/2007 | Jain et al. | 709/204 |
| 2008/0133660 A1 * | 6/2008 | Salesky et al. | 709/204 |
| 2008/0244419 A1 * | 10/2008 | Kurpick et al. | 715/756 |
| 2009/0019374 A1 * | 1/2009 | Logan et al. | 715/753 |
| 2009/0099845 A1 * | 4/2009 | George | 704/235 |
| 2009/0157672 A1 * | 6/2009 | Vemuri | 707/5 |
| 2010/0005142 A1 * | 1/2010 | Xiao et al. | 709/204 |
| 2010/0125353 A1 * | 5/2010 | Petit-Huguenin | 700/94 |

OTHER PUBLICATIONS

Citrix. GoToWebinar™ User Guide. © 2008 Citrix Online, LLC.*
Archive for May 12th, 2009, http://nxpfs.wordpress.com/2009/05/12, "What are Different Types of Federations?", posted by Farzin Shahidi on May 12, 2009.
Yahoo! Live from Wikipedia, the free encyclopedia, http://en.wikipedia.org/wiki/Yahoo! Live, "The service was closed on Dec. 8, 2008."

* cited by examiner

*Primary Examiner* — Steven B Theriault
*Assistant Examiner* — Amy M Levy
(74) *Attorney, Agent, or Firm* — Snell & Wilmer L.L.P.

(57) ABSTRACT

A virtual meeting place system is disclosed. The online virtual meeting place facilitates initiating, scheduling, or spontaneously organizing an online discussion or meeting, organizing the discussion into active and passive participants, limiting or eliminate participation of selected participants and soliciting, receiving and answering questions. The system is configurable to allow for customization based upon the social protocols or preferences of meeting participants and may present different user interfaces based upon participant identity, meeting topic or meeting format.

16 Claims, 2 Drawing Sheets

VIRTUAL MEETING PLACE SYSTEM AND METHOD

CROSS REFERENCE TO RELATED APPLICATIONS

This application claims priority to, and the benefit of, U.S. Provisional Application Ser. No. 61/165,047, entitled "VIRTUAL MEETING PLACE SYSTEM AND METHOD" and filed Mar. 31, 2009, which is incorporated herein by reference.

FIELD OF INVENTION

The present invention generally relates to enabling virtual meeting, and more particularly, to providing a virtual meeting place that facilitates traditional paradigms of interaction and the social protocols associated with traditional communication methods.

BACKGROUND

The internet has revolutionized the way that people communicate. In many instances, old systems of communication, along with the modes and social customs associated with these systems, have become outdated. The speed and convenience provided by internet enabled communication is an undeniable benefit. However, at the same time, traditional paradigms of interaction and the social protocols associated with traditional communication methods have also been lost. For many, the inability of typical internet communication mediums to provide an environment reflecting such time tested communication modes detracts from the utility and enjoyment of communicating.

Thus, a long-felt need exists to provide a virtual meeting place with voice capability that combines the speed and convenience of internet communication with enhanced functionality such as the ability to organically organize discussions, control access and participation in discussions, selectively join or sample a discussion, and spawn a new discussion.

SUMMARY

The present invention enables a virtual meeting place. Virtual meeting place systems and methods enable users to interact online while observing traditional paradigms of interaction and the social protocols associated with traditional communication methods. For example, meetings or discussions may be initiated or created similar to the way people meet on the streets of their home town and strike up a conversation. Custom controls allow meeting participants to exclude or limit input from others and/or eliminate undesirable participants from attendance.

In one embodiment, a computer enabled virtual meeting system (VMS) receives, from a first participant, a request to create a meeting wherein the meeting is associated with a user interface and a plurality of participants. The VMS assigns a first participant type to the first participant. The VMS receives a first attendance request from a second participant for access to the meeting and assign a first participant type to the first participant. The VMS receives first input from the first participant and determines, based upon the second participant type, that the second participant should receive the first input. In an embodiment, based upon the second participant type, input received from the second participant may not be sent to the first participant.

BRIEF DESCRIPTION OF THE DRAWINGS

A more complete understanding of the present inventions may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
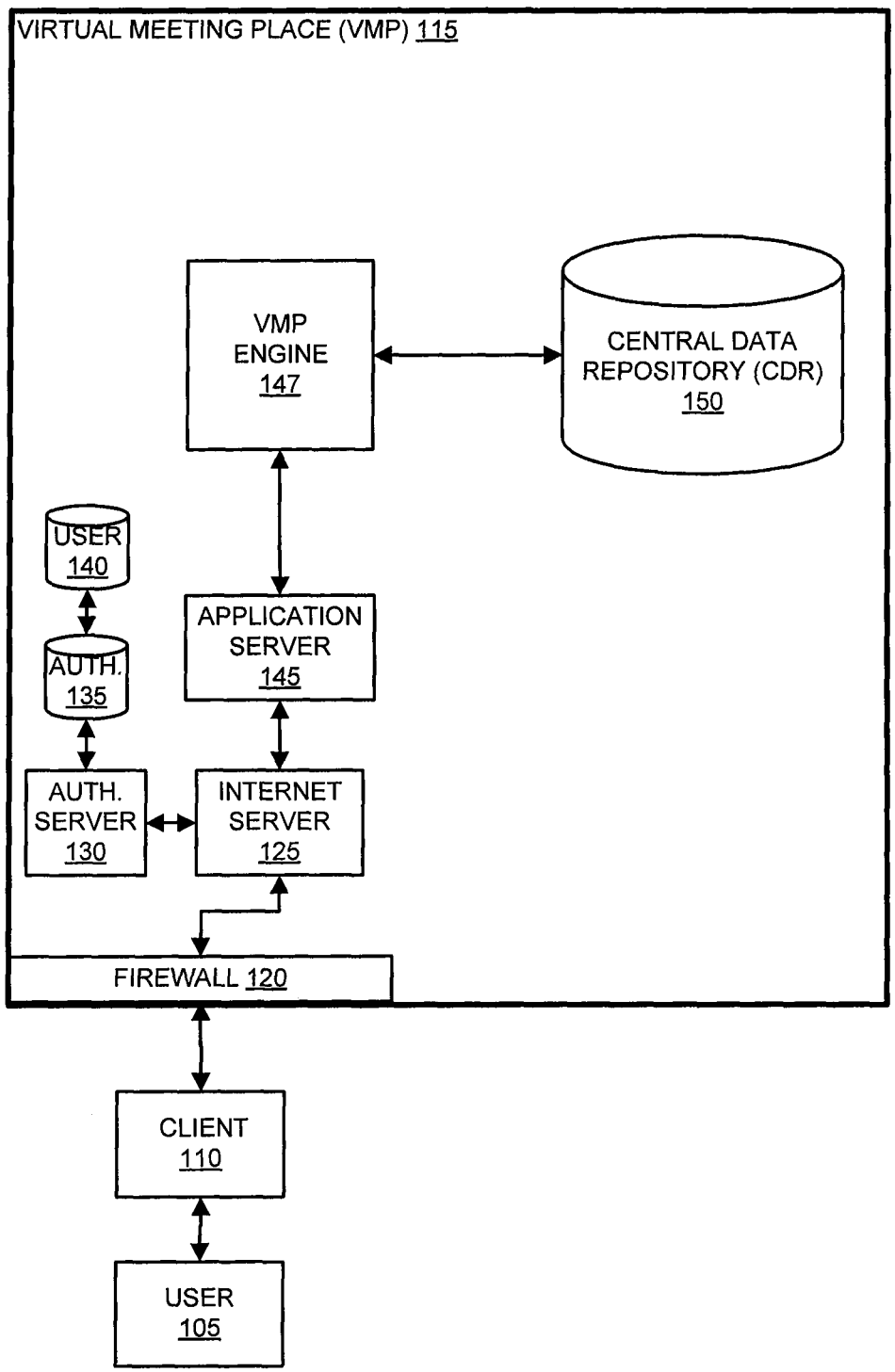
FIG. 1 is a block diagram illustrating major system components for enabling a virtual meeting place, in accordance with an exemplary embodiment of the present invention; and, FIG. 2 is a diagram showing a virtual meeting place interface, in accordance with an exemplary embodiment of the present invention.

The present invention fundamentally changes the way people meet and interact on the internet. The invention improves upon existing systems by providing a tangible, integrated, online virtual meeting place. The invention may be implemented by a system or a method or any combination of systems and methods. The virtual meeting place may allow users to initiate, schedule, or spontaneously organize an online audio discussion, organize the discussion into active and passive participants, limit or eliminate participation of selected participants and solicit, receive and answer questions. In one embodiment, the virtual meeting place enables audio, video and/or text interaction and allows participants to share content. An interface for the virtual meeting place may provide functionality analogous to an auditorium setting.

Although the auditorium setting is used as an analogy to provide a description of the virtual meeting place, one skilled in the art will recognize that, in various embodiments, both the functions and the interface, controls and graphics are configurable to provide a variety of functionality and form. For example, the various embodiments of the virtual meeting place may be implemented to provide communication functions and experiences analogous to a parent teacher conference, an association meeting, an expert question and answer session, a club or association meeting, a nightclub, an academic discussion, a debate, and a consultation with an expert (e.g., legal, medical, computer, etc.).

While the embodiments described herein are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a user interface (UI), a software module, logic engines, numerous databases and computer networks. While the system may contemplate upgrades or reconfigurations of existing processing systems, changes to existing databases and system tools are not necessarily required by the present invention.

The benefits provided by this invention include, for example, increased usability, functionality, comfort, familiarity and efficiency in online communications. Individuals benefit from the increased ability to strike up discussions with people sharing the same interests, while having access to controls (e.g., limiting the participation of some users and/or eliminating users from the discussion).

While the description references specific technologies, system architectures and data management techniques, practitioners will appreciate that this description is but one embodiment and that other devices and/or methods may be implemented without departing from the scope of the invention. Similarly, while the description references a user interfacing with the system via a personal computer user interface, practitioners will appreciate that other interfaces may include mobile devices, kiosks and handheld devices such as personal digital assistants.

A "user" may include any individual, entity, software and/or hardware that interacts with a system and/or participates in a process. With reference to FIG. 1, user 105 may perform tasks such as requesting, retrieving, receiving, updating, analyzing, entering and/or modifying data. User 105 may interface with Internet server 125 via any communication protocol, device or method discussed herein, known in the art, or later developed. User 105 may be any participant in any type of meeting, discussion or user interaction. Such a participant may be, for example, an expert, a professional, a sports enthusiast, a leader of an organization, an outdoorsman, a political junkie, etc.

In one embodiment, with reference to FIG. 1, system 101 includes a user 105 interfacing with a virtual meeting place ("VMP") 115 by way of a client 110. VMP 115 is a fully integrated system comprised of various subsystems, modules and databases. Client 110 comprises any hardware and/or software suitably configured to facilitate requesting, retrieving, updating, analyzing, entering and/or modifying data. The data may include communication data (e.g. audio, video, text), verification data, authentication data, instructional data, demographic data, transaction data, or any information discussed herein. Client 110 includes any device (e.g., personal computer), which communicates (in any manner discussed herein) with the VMP 115 via any network discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand held computers, portable computers, kiosks, and/or the like. Practitioners will appreciate that the client 110 may or may not be in direct contact with the VMP 115. For example, the client 110 may access the services of the VMP 115 through another server, which may have a direct or indirect connection to Internet server 125.

Figure 2:
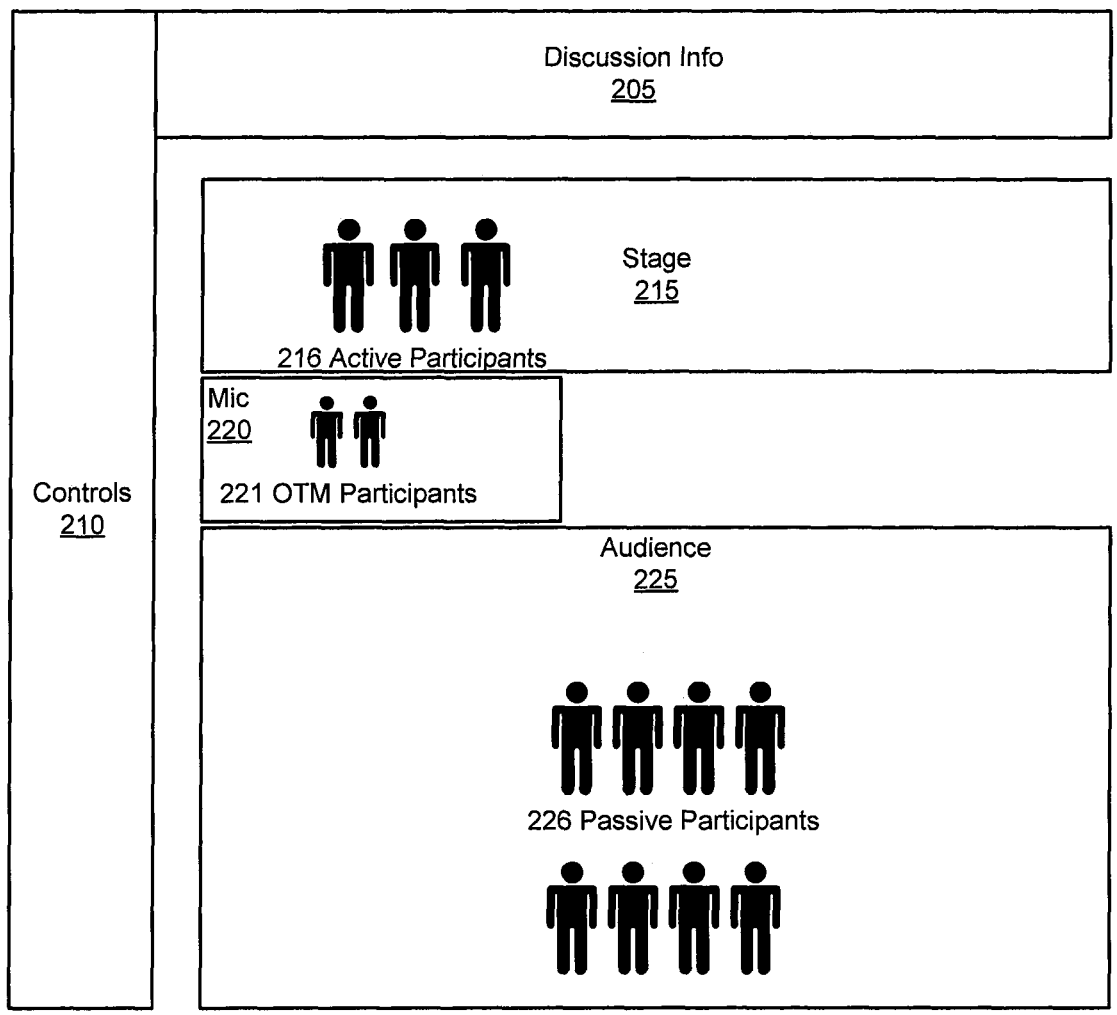

Referring now to FIG. 2, an embodiment of a user interface communicated to user 105 via client 110 is shown. VMP user interface (UI) 201 presents a user with a virtual meeting place and a variety of controls to participate in a discussion. Discussion info 205 shows the parameters associated with the discussion such as the topic, the list of active participants, etc. Controls 210 is an area comprising user controls such as change discussion, scan discussions, ask a question, record the discussion, spawn a new discussion, or vote to remove a participant. The functions associated with these controls will be discussed in detail below.

In one embodiment, UI 201 shows three areas which are associated with users' rights. Users rights may include, for example, user permissions, user roles, user interfaces and controls enabled on a user interface. Stage 215 displays the active participants 216 of a discussion, Mic 220 displays on-the-microphone (OTM) participants 221, and audience 225 displays passive participants 226. Active participants 216 can be heard by all members of the discussion while passive participants 221 may not have the ability to directly participate in the discussion. In one embodiment, OTM participants are quasi-active participants, e.g., users 105 who have limited rights of participation and may be heard by the entire discussion, or by a subset, and whose access to such limited rights is temporary.

Referring again to FIG. 1, user 105 may communicate with the VMP 115 through a firewall 120 to help ensure the integrity of the VMP 115 components. Internet server 125 may include any hardware and/or software suitably configured to facilitate communications between the client 110 and one or more VMP 115 components.

Firewall 120, as used herein, may comprise any hardware and/or software suitably configured to protect VMP 115 components from users of other networks. Firewall 120 may reside in varying configurations including stateful inspection, proxy based and packet filtering, among others. Firewall 120 may be integrated as software within Internet server 125, any other system 101 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within authentication database 135 and user database 140. Application server 145 may include any hardware and/or software suitably configured to serve applications and data to a connected client 110.

According to one embodiment, VMP 115 is used to manage and integrate an online or other computer-based meeting place. VMP 115 is a fully integrated system comprised of various subsystems, modules and databases. With reference again to FIG. 1, VMP 115 combines and allows communication with a central data repository ("CDR") 150 and various other portals and UIs (not shown in FIG. 1). In one embodiment, UIs are accessed via a web portal and the elements of the UI may be comprised of movable, resizable web parts. These components are interconnected and communicate with one another to allow for a completely integrated online meeting place that allows users, for example, to initiate, organize, manage, participate in, search for, monitor, and record discussions, debates, speeches or any interaction among users.

Virtual meeting place engine ("VMP Engine") 147 is a software module configured to enable online functions such as receiving query requests, configuring responses, dynamically configuring user interfaces, requesting data, receiving data, displaying data, streaming audio and/or video data, prompting user 105 with security challenges, verifying user responses, authenticating the user, initiating VMP 115 processes, initiating other software modules, encrypting and decrypting. Additionally, VMP Engine 147 may include any hardware and/or software suitably configured to receive requests from client 110 via Internet server 125 and the application server 145. VMP Engine 147 is further configured to process requests, execute transactions, construct database queries, and/or execute queries against databases, within system 101 (e.g., central data repository ("CDR") 150), external data sources 161 and temporary databases.

VMP Engine 147 is configured to exchange data with other systems and application modules. In one embodiment, the VMP Engine 147 may be configured to interact with other system 101 components to perform complex calculations, retrieve additional data, format data into reports, create XML representations of data, construct markup language documents, construct, define or control UIs, and/or the like. Moreover, VMP Engine 147 may reside as a standalone system or may be incorporated with the application server 145 or any other VMP 115 component as program code. As one of ordinary skill in the art will appreciate, VMP Engine 147 may be logically or physically divided into various subcomponents such as a workflow engine configured to evaluate predefined rules and to automate processes associated with a virtual meeting place implemented in VMP 115.

In addition to the components described above, system 101, and VMP 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 101 components may be embodied as a customization of an existing system, an add-on product, upgraded software, a stand-alone system (e.g., kiosk), a distributed system, a method, a data processing system, a device for data processing, and/or a computer program product. Accordingly, individual system 101 components may take the form of an entirely software embodiment, an entirely hardware embodiment, or an embodiment combining aspects of both software and hardware. Furthermore, individual system 101 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Client 110 may include an operating system (e.g., Windows® XP, Windows NT, 95/98/2000, XP, Vista, OS2, UNIX™, Linur™, Solaris™, MacOS™, Windows Mobile OS, Windows CE, Palm® OS, Synwbian™ OS, Blackberry® OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package, Client 110 and VMP 115 components may he independently, separately or collectively suitably coupled to the network via data links which includes, for example, a connection to an Internet Service Provider (ISP) over the local loop as is typically used in connection with standard wireless communications networks and/or methods, modem communication, cable modem, Dish networks, ISDN, Digital Subscriber Line (DSL), see, e.g., Gilbert Held, Understanding Data Communications (1996). In various embodiments, any portion of client 110 is partially or fully connected to a network using a wired ("hard wire") connection. As those skilled in the art will appreciate, client 110 and/or any of the system components may include wired and/or wireless portions.

Internet server 125 may be configured to transmit data to client 110 within markup language documents, "Data" may include encompassing information such as commands, transaction requests, queries, files, data for storage, and/or the like in digital or any other form, Internet server 125 may operate as a single entity in a single geographic location or as separate computing components located together or in separate geographic locations, Further, Internet server 125 may provide a suitable web site or other Internet-based graphical user interface, which is accessible by users. In various embodiments, the Microsoft Internet information Server (IIS), Microsoft Transaction Server (MTS), and Microsoft SQL Server™, are used in conjunction with the Microsoft operating system, Microsoft NT web server software, a Microsoft SQL-Server™ database system, and a Microsoft Commerce Server, Additionally, components such as Access or Microsoft SQL Server™, Oracle®, Sybase®, Informix® MySQL, InterBase™, etc., may be used to provide an Active Data Object (ADO) compliant database management system.

Like Internet server 125, application server 145 may communicate with any number of other servers, databases and/or components through any means known in the art. Further, application server 145 may serve as a conduit between client 110 and the various systems and components of VMP 115. Internet server 125 may interface with application server 145 through any means known in the art including a LAN/WAN, for example. Application server 145 may further invoke software modules such as the VMP Engine 147 in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard documents, various forms, Java™ applets, JavaScript®, active server pages (ASP), common gateway interface scripts (CGI), Flash files or modules, FLEX™, ActionScript™, extensible markup language (XML), dynamic HTML, cascading style sheets (CSS), helper applications, plug-ins, and/or the like. A server may include a web service that receives a request from a web server, the request including a URL, (e.g., http://yahoo.com/) and an internet protocol ("IP") address. The web server retrieves the appropriate web pages and sends the data or applications for the web pages to the IP address. Web services are applications that are capable of interacting with other applications over a communications means, such as the Internet, Web services are typically based on standards or protocols such as XML, SOAP, WSDL and UDDI, Web services methods are well known in the art, and are covered in many standard texts. See, e.g., Alex Nghiem, IT Web Services: A Roadmap for the Enterprise (2003).

FIG. 1 depicts databases that are included in an exemplary embodiment of the invention. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within system 101 may represent multiple hardware, software, database, data structure and networking components. Furthermore, embodiments are not limited to the exemplary databases described herein, nor do embodiments necessarily utilize each of the disclosed exemplary databases.

Authentication database 135 may store information used in the authentication process such as, for example, user identifiers, passwords, access privileges, user preferences, user statistics, and the like. User database 140 maintains user information and credentials for VMP 115 users (e.g., user 105).

CDR 150 is a data repository that is configured to store a wide variety of comprehensive data for a virtual meeting place. While depicted as a single logical entity in FIG. 1, those of skill in the art will appreciate that CDR 150 may, in some embodiments, consist of multiple physical and/or logical data sources. In one embodiment, CDR 150 stores audio data, video data, configuration data, profile data, historical data, schedules, security profiles, audit records, predefined rules, process definitions, financial data, and the like.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access™ or Microsoft SQL Server™ by Microsoft Corporation (Redmond, Wash.), MySQL by MySQL, AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art For example, the association may be accomplished either manually or automatically. Automatic association techniques may include, for example, a database search, a database merge, GRED, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors, Various database tuning steps are contemplated to optimize database performance. For example, frequently used files such as indexes may be placed on separate, file systems to reduceOut ("I/O") bottlenecks.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e,g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java™, JavaScript®, Flash, Action-Script™, FLEX™, VBScript™, Macromedia Cold Fusion™, COBOL, Microsoft Active Server Pages™, assembly, PERL, PHP, awk, Python™, Visual Basic™, SQL Stored Procedures, PL/SQL, any UNIX™ shell script, and extensible markup language (XML) with the various algorithms being implemented with any combination of data structures, objects, processes, routines or other programming elements, Further, it should be noted that the system may employ any number of conventional techniques for data transmission, signaling, data processing, network control, and the like. Still further, the system could be used to detect or prevent security issues with a client-side scripting language, such as JavaScript™, VBScript™ or the like. For a basic introduction of cryptography and network security, see any of the following references: (1) "Applied Cryptography: Protocols, Algorithms, And. Source Code in C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Referring again to FIG. 1, in one embodiment, when user 105 logs onto an application Internet server 125 may invoke an application server 145. Application server 145 invokes logic in the VMP Engine 147 by passing parameters relating to the user's 105 requests for data. VMP 115 manages requests for data from VMP Engine 147 and communicates with system 101 components. Transmissions between user 105 and Internet server 125 may pass through a firewall 120 to help ensure the integrity of VMP 115 components. Practitioners will appreciate that the invention may incorporate any number of security schemes or none at all. In one embodiment, Internet server 125 receives requests from client 110 and interacts with various other system 101 components to perform tasks related to requests from client 110.

Internet server 125 may invoke an authentication server 130 to verify the identity of user 105 and assign roles, access rights and/or permissions to user 105. In order to control access to the application server 145 or any other component of VMP 115, Internet server 125 may invoke an authentication server 130 in response to user 105 submissions of authentication credentials received at Internet server 125. When a request to access system 101 is received from Internet server 125, Internet server 125 determines if authentication is required and transmits a prompt to client 110. User 105 enters authentication data at client 110, which transmits the authentication data to Internet server 125. Internet server 125 passes the authentication data to authentication server which queries the user database 140 for corresponding credentials. When user 105 is authenticated, user 105 may access various applications and their corresponding data sources.

As discussed above, with reference to FIG. 2, UI 201 provides a stage 215 where active participants 216 engage in a discussion and an audience 225 for passive participants 226 to listen to the discussion, e.g., the active participants 216 are "on the auditorium stage" and the passive participants are "in the audience." In one embodiment, the input provided by active participants 216 (e.g., voice data) is accessible by all members of the discussion (i.e., both active and passive), while passive participants 226 may not have the ability to directly enter data into the discussion. That is, passive participants may not be able to transmit voice data that can be heard by other participants. However, in an embodiment, passive participants may, by using a control 210 (e.g., click a button, dial a number, etc.), indicate that they wish to offer a comment or ask a question. Passive participant 226 is placed in a queue and may receive an indication of their position in the queue and/or estimated wait time. Passive participant 226 is converted to an OTM participant 221 in the discussion and may actively interact (e.g., via audio communication) with the other active participants.

The number of active participants 216, passive participants 226 and quasi-active (e.g., OTM participants 221) may be unrestricted. However, in an embodiment, the number of OTM participants 221 is a finite number; such a scenario is analogous to an auditorium setting where a number of microphones are provided for members of the audience to ask questions to the discussion participants on stage. In one embodiment, a passive participant 226 or OTM participant 221 may be converted to an active participant 216 during the course of an ongoing discussion. For example, an OTM participant 221 asks a particularly insightful question and the active participants 216 may vote to convert the OTM participant 221 into an active participant 216. Participants may be converted to a different type of participant or restricted from a discussion completely (e.g., exclude or "bounce" a participant). For example, an active participant 216 has a control 210 that initiates an action to convert a selected active participant 216 to a passive participant 226 or to "bounce" a participant, permanently or temporarily eliminating them from any type of participation in the discussion. In one embodiment, a participant is bounced according to a rule associated with the discussion. For example, an active participant 216 wishes to bounce a second active participant, so the remaining active participants are prompted to vote whether to bounce the second active participant. This functionality is useful in some discussion scenarios to provide participants with a productive, efficient, and/or pleasant experience within the discussion.

A discussion may be created or initiated in a variety of methods. In one embodiment, a group of users agree to set up a discussion. User 105 sets up the discussion by specifying parameters such as number of active participants, number of passive participants, category, topic, start time, end time, public, private or semi-private, number of total participants, invitation list, participant exclusion rules, participation rules, participation types, number of quasi-active participants, meeting type, topic, agenda, time etc. In an embodiment, the user schedules the discussion for a future date and time, for multiple dates and times and/or on a recurring basis. User 105 may specify that the discussion be open to the public, completely private or a mixture of the two. For instance, user 105 may open a discussion with "Ohio State sports" as the topic and wait for other interested participants to join. In another example, user 105 is a doctor and initiates a discussion that is limited to only one other participant at a time. In an embodiment, user 105 may wish to conduct a discussion with a specified set of active participants, without limiting the number or identity of the passive participants. For example, user 105 who is an Ohio State sports fan may specify six active participants by entering the user names of two other Ohio State fans and the user names of three Michigan fans while placing no restriction on the identity of the passive participants.

As one skilled in the art will appreciate, in various embodiments, the identity of participants may be specified by user id, membership in a group, age, user rating, geographic location, certification or credential. Such identification of users is also useful to eliminate or restrict users from participation in a discussion. In an embodiment, participants in a discussion may elect to create or "spawn" an additional discussion. A new discussion is created with the option of copying the parameters (e.g. topic, category, privacy settings, number of active participants, etc) of the original discussion.

In one embodiment, user 105 visits a virtual meeting place portal (e.g., a web portal provided by VMP 115) and solicits a discussion, sets up a new discussion, reviews the schedule of discussions and/or searches ("scans") active discussions. User 105 may scan for scheduled and/or active discussions based upon a variety of factors such as topic, participant, discussion rating, etc. For example, user 105 may search for a discussion in which a friend is an active participant and choose to join that discussion. In one embodiment, user 105 scans the active discussions by accessing a scan function (e.g., by selecting a scan button control 210) on the web portal. User 105 may choose to scan all active discussions or a subset of discussions (e.g., scan sports related discussions). VMP Engine 147 executes logic to iterate thru the discussions, sending data associated with a particular discussion, such as audio data stream of a discussion, to user's 105 client 110 for a predetermined period of time (e.g., 10 seconds). In one embodiment, discussion topics may be associated with different "rooms" or "auditoriums." For instance, the virtual meeting place portal is organized similar to a convention center and user 105 may scan for rooms where an active discussion is taking place.

While the steps outlined above represent specific embodiments of the invention, practitioners will appreciate that there are any number of computing algorithms and user interfaces that may be applied to create similar results. The steps are presented for the sake of explanation only and are not intended to limit the scope of the invention in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention.

It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A method, comprising:
   creating, by a virtual meeting computer, a first meeting, wherein the first meeting is associated with a user interface, a plurality of participants each associated with a participant type, and a plurality of participant areas, wherein the plurality of participant areas comprise an active participant area comprising active participants, a passive participant area comprising passive participants, and an OTM participant area comprising on-the-microphone (OTM) participants, and wherein the plurality of participant areas are stored in a database;
   assigning, by the virtual meeting computer, a first participant type to a first participant of a plurality of first participants, wherein the first participant type is an active participant that engages in a discussion in the active participant area of the first meeting, and wherein input from the active participant is accessible by the first participant type and a second participant type;
   receiving, by the virtual meeting computer using a communication protocol, a first attendance request from a second participant to join the first meeting;
   assigning, by the virtual meeting computer, the second participant type to the second participant, wherein the second participant type is a passive participant that listens to the discussion in the passive participant area of the first meeting, and wherein the passive participant cannot directly enter input into the discussion;
   presenting, by the virtual meeting computer using the communication protocol, the user interface to the plurality of participants, wherein the user interface comprises the plurality of participant areas, each of the plurality of participant areas associated with at least one of an area role or an area permission;
   receiving, by the virtual meeting computer and from the second participant using the communication protocol, a queue request to be placed in a queue for offering input;
   providing, by the virtual meeting computer and to the second participant using the communication protocol, an indication of at least one of an estimated wait time or a position within the queue;
   determining, by the virtual meeting computer, that a predetermined number of OTM participants has not been exceeded;
   converting, by the virtual meeting computer, the second participant from the queue to the OTM participant in the first meeting for a limited period of time;
   allowing, by the virtual meeting computer using the communication protocol, the OTM participant to provide input and interact, with a plurality of the first participants for a limited period of time;
   promoting, by the virtual meeting computer, the OTM participant to an active participant type, based on volume of input and quality of input;
   displaying, by the virtual meeting computer and on the user interface using the communication protocol, the active participants in the active participant area, the passive participants in the passive participant area and the OTM participants in the OTM participant area;
   receiving, by the virtual meeting computer using the communication protocol, a request from the first participant to exclude a third participant from the first meeting, wherein the request includes the first participant requesting a vote from the plurality of first participants to exclude the third participant from the first meeting;
   prompting, by the virtual meeting computer using the communication protocol, the plurality of first participants to provide the votes whether the third participant should be excluded from the first meeting;
   determining, by the virtual meeting computer and based upon the votes received from the first participants, that the third participant be excluded from the first meeting;
   excluding, by the virtual meeting computer, the third participant from the first meeting;
   receiving, by the virtual meeting computer, a scan request via a scan control of the user interface, wherein the scan request includes a request to search for a subset of meetings related to a first topic and a meeting within the subset of meetings where certain multiple participants exist, including where the first participant is an active participant, and where the OTM participant is currently a quasi-active participant;
   iterating, by the virtual meeting computer and based upon the scan request, through a plurality of active meetings, wherein the iterating comprises providing first audio data associated with the first meeting to a user device of the user for a predetermined period of time and, in response to the first predetermined period of time expiring, providing second audio data associated with a second meeting to the user device of the user for the predetermined period of time;
   receiving, by the virtual meeting computer using the communication protocol and from at least one of the first participant or the second participant, a new discussion request to create a new discussion with similar parameters as the discussion in the first meeting, wherein the similar parameters are stored in the database; and
   creating, by the virtual meeting computer, the new discussion in a second meeting.

2. The method of claim 1, further comprising receiving a request from the second participant to send input to the first participant and, based upon the second participant type, denying the communication request.

3. The method of claim 2, further comprising, in response to the denying, placing the second participant in a quasi-participant queue associated with the quasi-participant area.

4. The method of claim 2, further comprising moving the second participant to the quasi-participant area and associating the second participant with the OTM participant type.

5. The method of claim 1, further comprising determining a participation limit has been reached by evaluating at least one of a number of comments, an amount of input, a length of a queue, a time limit or input from a third participant.

6. The method of claim 1, wherein the presenting the user interface comprises presenting a first user interface to a first subset of the plurality of participants wherein each participant in the first subset is associated with the first participant type and presenting a second user interface to a second subset of the plurality of participants wherein each participant in the second subset is associated with the second participant type.

7. The method of claim 1, further comprising:
determining, by the virtual meeting computer, a participation limit associated with the second participant acting as an OTM participant has been reached; and
in response to the determining the participation limit has been reached, moving, by the virtual meeting computer, the second participant from the OTM participant area to the passive participant area.

8. The method of claim 7, further comprising, in response to the receiving the exclusion request, excluding the third participant based upon the vote of the plurality of first participants and at least one of a participant type associated with the third participant, a participation limit associated with the third participant being reached, or a meeting type associated with the first meeting.

9. The method of claim 1, wherein the creating the first meeting occurs in response to receiving a request from the first participant and wherein the receiving the request to create the first meeting comprises receiving a request to at least one of: schedule the first meeting, list the first meeting on a meeting schedule, and configure the first meeting with user specified parameters wherein the user specified parameters comprise at least one of number of total participants, number of active participants, invitation list, participant exclusion rules, participation rules, participation types, number of passive participants, number of quasi-active participants, meeting type, topic, agenda, or time.

10. The method of claim 1, wherein the first meeting is associated with a meeting type associated with predefined meeting type rules, wherein the meeting type comprises at least one of a panel discussion, a debate, a discussion, a speech, a presentation, a parent teacher conference, an association meeting, an expert question and answer session, a club meeting, an association meeting, a nightclub interaction, an academic discussion, or a. consultation with an expert.

11. The method of claim 10, wherein the presenting the user interface comprises presenting each participant in the plurality of participants with a predefined meeting type user interface, wherein the predefined meeting type user interface is based upon at least one of the meeting type or a participant type associated with the respective participant.

12. The method of claim 1, further comprising presenting the first participant with the user interface further comprising a control and, in response to the first participant selecting the control, at least one of moving the participant to a second meeting, receiving a question input by the first participant, recording a meeting, or spawning a new a new meeting.

13. The method of claim 1, wherein the request to exclude a third participant from the first meeting further occurs in response to at least one of content or data contributed to the first meeting by the third participant, wherein the virtual meeting computer shares the contribution of the third participant with the first participant.

14. The method of claim 1, further comprising:
receiving, by the virtual meeting computer, first input from the first participant;
determining, by the virtual meeting computer and based upon the second participant type, that he second participant should receive the first input.

15. The method of claim 1, further comprising moving, by the virtual meeting computer, the second participant from the passive participant area to the active participant area and changing the second participant type to the first participant type.

16. A system comprising:
a network interface communicating with a tangible memory;
the memory communicating with a virtual meeting processor; and
the memory having instructions stored thereon that, in response to execution by the processor, cause the processor to perform operations comprising:
creating, by the processor, a first meeting, wherein the first meeting is associated with a user interface, a plurality of participants each associated with a participant type, and a plurality of participant areas, wherein the plurality of participant areas comprise an active participant area comprising active participants, a passive participant area comprising passive participants, and an OTM participant area comprising on-the-microphone (OTM) participants, and wherein the plurality of participant areas are stored in a database;
assigning, by the processor, a first participant type to a first participant of a plurality of first participant, wherein the first participant type is an active participant that engages in a discussion in the active participant area of the first meeting, and wherein input from the active participant is accessible by the first participant type and a second participant type;
receiving, by the processor using a communication protocol, a first attendance request from a second participant to join the first meeting;
assigning, by the processor, the second participant type to the second participant, wherein the second participant type is a passive participant that listens to the discussion in the passive participant area of the first meeting, and wherein the passive participant cannot directly enter input into the discussion;
presenting, by the processor using the communication protocol, the user interface to the plurality of participants, wherein the user interface comprises the plurality of participant areas, each of the plurality of participant areas associated with at least one of an area role or an area permission;
receiving, by the processor and from the second participant using the communication protocol, a queue request to he placed in a queue for offering input;
providing, by the processor and to the second participant using the communication protocol, an indication, of at least one of an estimated wait time or a position within the queue;
determining, by the processor, that a predetermined number of OTM participants has not been exceeded;
converting, by the processor, the second participant from the queue to the OTM participant in the first meeting for a limited period of time;
allowing, by the processor using the communication protocol, the OTM participant to provide input and interact with a plurality of the first participants for a limited period of time;

promoting, by the processor, the OTM participant to an active participant type, based on volume of input and quality of input;

displaying, by the processor and on the user interface using the communication protocol, the active participants in the active participant area, the passive participants in the passive participant area and the OTM participants in the OTM participant area;

receiving, by the processor using the communication protocol, a request from the first participant to exclude a third participant from the first meeting, wherein the request includes the first participant requesting a vote from the plurality of first participants to exclude the third participant from the first meeting;

prompting, by the processor using the communication protocol, the plurality of first participants to provide the votes whether the third participant should be excluded from the first meeting;

determining, by the processor and based upon the votes received from the first participants, that the third participant be excluded from the first meeting;

excluding, by the processor, the third participant from the first meeting;

receiving, by the processor, a scan request via a scan control of the user interface, wherein the scan request includes a request to search for a subset of meetings related to a first topic and a meeting within the subset of meetings where certain multiple participants exist, including where the first participant is an active participant, and where the OTM participant is currently a quasi-active participant;

iterating, by the processor and based upon the scan request, through a plurality of active meetings, wherein the iterating comprises providing first audio data associated with the first meeting to a user device of the user for a predetermined period of time and, in response to the first predetermined period of time expiring, providing second audio data associated with a second meeting to the user device of the user for the predetermined period of time;

receiving, by the processor using the communication protocol and from at least one of the first participant or the second participant, a new discussion request to create a new discussion with similar parameters as the discussion in the first meeting, wherein the similar parameters are stored in the database; and creating, by the processor, the new discussion in a second meeting.

* * * * *

UNITED STATES PATENT AND TRADEMARK OFFICE
CERTIFICATE OF CORRECTION

PATENT NO.        : 8,887,069 B2
APPLICATION NO.   : 12/750989
DATED             : November 11, 2014
INVENTOR(S)       : Kishore Tipirneni It is certified that error appears in the above-identified patent and that said Letters Patent is hereby corrected as shown below:

In the Specification,

In Column 5 Line 45, please delete "Linur" and insert therefor --Linux--.

In Column 5 Line 46, please delete "Synwmian" and insert therefor --Symbian--.

In Column 8 Lines 4-5, after "JavaScript" please delete "TM" and insert therefor --®--.

In the Claims,

In Column 14 Line 31, please delete the second occurrence of "participant" and insert therefor --participants--.

Signed and Sealed this
Third Day of March, 2015

Michelle K. Lee
*Deputy Director of the United States Patent and Trademark Office*